(12) United States Patent
Ray et al.

(10) Patent No.: US 10,444,368 B2
(45) Date of Patent: Oct. 15, 2019

(54) MEASURING CLOUD METRICS USING DIVERGING QUASI-OPTICAL RADAR

(71) Applicant: Rosemount Aerospace Inc., Burnsville, MN (US)

(72) Inventors: Mark Ray, Burnsville, MN (US); Kaare Josef Anderson, Farmington, MN (US); Mark Sherwood Miller, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 437 days.

(21) Appl. No.: 15/240,438

(22) Filed: Aug. 18, 2016

(65) Prior Publication Data
US 2018/0052237 A1 Feb. 22, 2018

(51) Int. Cl.
*G01C 3/08* (2006.01)
*G01S 17/95* (2006.01)
(Continued)

(52) U.S. Cl.
CPC .............. *G01S 17/95* (2013.01); *B64D 15/20* (2013.01); *B64D 45/00* (2013.01); *G01S 7/026* (2013.01);
(Continued)

(58) Field of Classification Search
CPC . G01S 17/95; G01S 7/026; G01S 7/28; G01S 7/4818; G01S 7/499; G01S 7/483; B64D 15/20; H01Q 13/02; H01P 1/161
(Continued)

(56) References Cited

U.S. PATENT DOCUMENTS 5,748,091 A 5/1998 Kim
7,312,713 B2 12/2007 Alfano et al.
(Continued)

FOREIGN PATENT DOCUMENTS

CN 202075225 U 12/2011
WO 2014132074 A3 9/2014

OTHER PUBLICATIONS

Pazmany, Andrew L, et. al., "An Airborne 95 GHz Dual-Polarized Radar for Cloud Studies", Institute of Electrical and Electronic Engineers, Jul. 1994, vol. 32, No. 4, 9 pages.
(Continued)

*Primary Examiner* — Mark Hellner
(74) *Attorney, Agent, or Firm* — Kinney & Lange, P.A.

(57) ABSTRACT

Apparatus and associated methods relate to determining, based on a detected portion of a projected pulse of quasi-optical energy backscattered by water particles within a divergent projection volume of a cloud atmosphere, properties of the backscattering water particles. The pulse of quasi-optical energy is projected into the divergent projection volume of the cloud atmosphere. The divergent projection volume is defined by an axis of projection and an angle of projection about the axis of projection. The portion of the projected pulse of optical energy backscattered by water particles within the divergent projection volume of the cloud atmosphere is received and detected. Various properties of the backscattering water particles, which can be determined from the detected portion of the projected pulse backscattered by water particles can include particle density and/or particle size.

19 Claims, 6 Drawing Sheets

(51) Int. Cl.
| | |
|---|---|
| *B64D 15/20* | (2006.01) |
| *G01S 7/02* | (2006.01) |
| *G01S 7/28* | (2006.01) |
| *G01S 7/481* | (2006.01) |
| *G01S 7/483* | (2006.01) |
| *G01S 7/499* | (2006.01) |
| *G01S 13/86* | (2006.01) |
| *G01S 13/95* | (2006.01) |
| *H01P 1/161* | (2006.01) |
| *B64D 45/00* | (2006.01) |
| *H01Q 13/02* | (2006.01) |
| *H01P 1/17* | (2006.01) |
| *H01Q 5/22* | (2015.01) |

(52) U.S. Cl.
CPC ............... *G01S 7/28* (2013.01); *G01S 7/483* (2013.01); *G01S 7/4818* (2013.01); *G01S 7/499* (2013.01); *G01S 13/865* (2013.01); *G01S 13/953* (2013.01); *H01P 1/161* (2013.01); *H01P 1/173* (2013.01); *H01Q 5/22* (2015.01); *H01Q 13/02* (2013.01); *Y02A 90/18* (2018.01); *Y02A 90/19* (2018.01)

(58) Field of Classification Search
USPC ..................................................... 356/4.01
See application file for complete search history.

(56) References Cited

U.S. PATENT DOCUMENTS

| | | | |
|---|---|---|---|
| 8,619,265 | B2 | 12/2013 | Steffey et al. |
| 8,866,322 | B2 | 10/2014 | Tchoryk, Jr. et al. |
| 2009/0002220 | A1* | 1/2009 | Lovberg ............... G01S 13/89 342/33 |
| 2010/0110431 | A1* | 5/2010 | Ray ....................... B64D 15/20 356/342 |
| 2016/0252609 | A1* | 9/2016 | Bowring ................ G01S 7/024 342/27 |
| 2017/0055464 | A1* | 3/2017 | Arakelyan ............. A01G 13/00 |
| 2018/0024226 | A1* | 1/2018 | Izadian ................. G01S 7/024 342/188 |

OTHER PUBLICATIONS

Leal-Sevillano, Carlos A., et. al., "A 225 GHz Circular Polarization Waveguide Duplexer Based on a Septum Orthomode Transducer Polarize", Institute of Electrical and Electronic Engineers, Sep. 2013, vol. 3, No. 5, 10 pages.

Dawei, An, et al., "Remote sensing of clouds and Evaluation with a 220GHz radar", SPIE: The international Society for Optics and Photonics, vol. 9259, 2014, 6 pages.

Extended European Search Report, for European Patent Application No. 17186894.6, dated Jan. 25, 2018, 9 pages.

\* cited by examiner

MEASURING CLOUD METRICS USING DIVERGING QUASI-OPTICAL RADAR

BACKGROUND

Various cloud conditions can present risks to aircraft when traveling through them. If the temperature of a cloud atmosphere is below the freezing point for water, water droplets can become super-cooled liquid droplets. These super-cooled liquid droplets can then undergo a liquid-to-solid phase change upon impact with an aircraft surface. Ice accretes at different surface regions for different sizes of the super-cooled liquid droplets in the cloud atmosphere. Thus, characterizing the density and/or sizes of super-cooled water droplets in a cloud atmosphere can facilitate prediction of surface regions where ice will accrete as well as providing alerts of potentially dangerous conditions to a pilot.

Super-cooled small water droplets tend to form ice only on leading edges of an aircraft's exterior surface. Super-cooled large water droplets (SLDs), however, can strike the leading edge of a wing and run back past any icing protection systems, or can traverse airflow vectors and strike surfaces aft of these leading edges. Ice that forms on unprotected surface regions can severely alter the aerodynamics of the aircraft. Such ice accretion may cause aircraft stall or result in unpredictable aircraft control variation that might lead to flight issues. When in a cloud, ice can form on control surfaces and/or lift surfaces.

Not every cloud, however, has a significant population of SLDs. Different clouds and different atmospheric conditions might be accompanied by various water droplet size distributions, different ice/liquid ratios, etc., some of which may be entirely safe to an aircraft, while others may not be safe. Such water droplet size distributions and ice/liquid ratios may be measured as cloud metrics using various types of instruments.

Some aircraft are equipped with Light Detection and Ranging (LIDAR) systems to measure cloud metrics. Such systems can characterize clouds that have water droplets that have a size distribution having a single mode. Either the mean droplet size or the mode droplet size can be calculated by inversion of a LIDAR model of a backscatter signal using such systems. These systems can also calculate the density of water droplets for such mono-modal distributions.

Multi-modal distributions of water droplet sizes, however, can be difficult to characterize. Such multi-modal distributions may occur, for example, when cumulus clouds drop drizzle or rain into a lower stratiform cloud deck, creating icing conditions. For droplet size distributions having a dominant mode and a secondary mode (e.g. large quantity of relatively small water droplets plus a small quantity of large water droplets), it can be difficult to detect the anomalous amounts of large water droplets in the secondary mode.

Both collimated and uncollimated LIDAR systems can have difficulties in detecting SLDs. Collimated LIDAR systems project pulses of a laser beam into the cloud atmosphere and then sense the signal backscattered by the cloud atmosphere. The collimated laser beam samples a relatively small volume of the cloud, due to the collimated beam having a small field of view (e.g., 4 mrad of divergence is not atypical). Sampling such a small cloud volume can result in the beam encountering few, if any of the SLDs of a secondary mode.

Depending on the size and density of the SLDs in the secondary mode in the droplet size distribution, the backscatter signal can appear as scintillation spikes superimposed on an otherwise smooth continuous range-resolved backscatter signal characteristic of the primary mode in the droplet size distribution. The size and frequency of occurrence of the scintillation spikes depends on the sizes of the SLDs and on the volume of space probed by the collimated laser beam.

Unlike the smooth range-resolved backscatter signal from small droplets in the primary mode, backscatter signals from large droplets in the secondary mode can result in randomly occurring scintillation pulses. Averaging of such backscatter signals over multiple laser pulses, while boosting the signal-to-noise ratio of the small droplet contribution, can cause the sporadic spikes from the sparse large droplets to be attenuated, and perhaps even fall below a noise floor. Thus, the SLDs, which can be hazardous to aircraft, may not be sensed.

Uncollimated LIDAR systems project a diverging beam of energy into the cloud atmosphere, thereby probing a large volume of the cloud atmosphere. Such uncollimated LIDAR systems then sense the signal backscattered by water particles within the probed volume of the cloud atmosphere. Probing such a large volume can result in a backscatter signal resulting from a large number of SLDs, thereby resulting in a smooth range-resolved backscatter signal absent of scintillation pulses. Even though large droplets contribute to the smooth range-resolved backscatter signal, the SLD contribution to such a backscatter signal can be modest compared with the contribution due to small droplets.

Furthermore, mono-modal distributions of SLDs in a cloud atmosphere can also be problematic, if the density of SLDs is small. Again, the backscatter signal can be characterized by randomly located scintillation spikes. Averaging of such backscatter signals can result in a signal amplitude that is small. Such a small signal may even fall below an instrument noise floor. Measurement techniques and instruments, which can more accurately characterize water droplet distributions, are needed.

SUMMARY

Apparatus and associated devices relate to a system for measuring metrics of a backscattering population of water particles of a cloud atmosphere. The system includes a quasi-optical transmitter configured to project a pulse of quasi-optical energy from a horn aperture into a divergent projection volume of the cloud atmosphere. The divergent projection volume is defined by an axis of projection and an angle of projection about the axis of projection. The angle of projection is based on a ratio of a transverse dimension of the horn aperture to a wavelength of the projected quasi-optical energy. The system includes a quasi-optical receiver configured to detect a portion of the projected pulse of quasi-optical energy backscattered by the backscattering population of water particles within the divergent projection volume of the cloud atmosphere. The system also includes a cloud metric calculator configured to determine, based on a detected portion of the projected pulse of quasi-optical energy backscattered by the backscattering population of water particles within the divergent projection volume of the cloud atmosphere, a density of the backscattering population of water particles within the divergent projection volume of the cloud atmosphere.

Some embodiments relate to a method for measuring metrics of a backscattering population of water particles of a cloud atmosphere. The method includes projecting a pulse of quasi-optical energy into a divergent projection volume of the cloud atmosphere. The divergent projection volume is defined by an axis of projection and an angle of projection about the axis of projection. The angle of projection is based on a ratio of a transverse dimension of a projecting aperture to a wavelength of the projected quasi-optical energy. The method includes receiving a portion of the projected pulse of quasi-optical energy backscattered by the backscattering population of water particles within the divergent projection volume of the cloud atmosphere. The method also includes determining, based on a detected portion of the projected pulse of quasi-optical energy backscattered by the backscattering population of water particles within the divergent projection volume of the cloud atmosphere, a density of the backscattering portion of water particles within the divergent projection volume of the cloud atmosphere.

DETAILED DESCRIPTION

Figure 1:
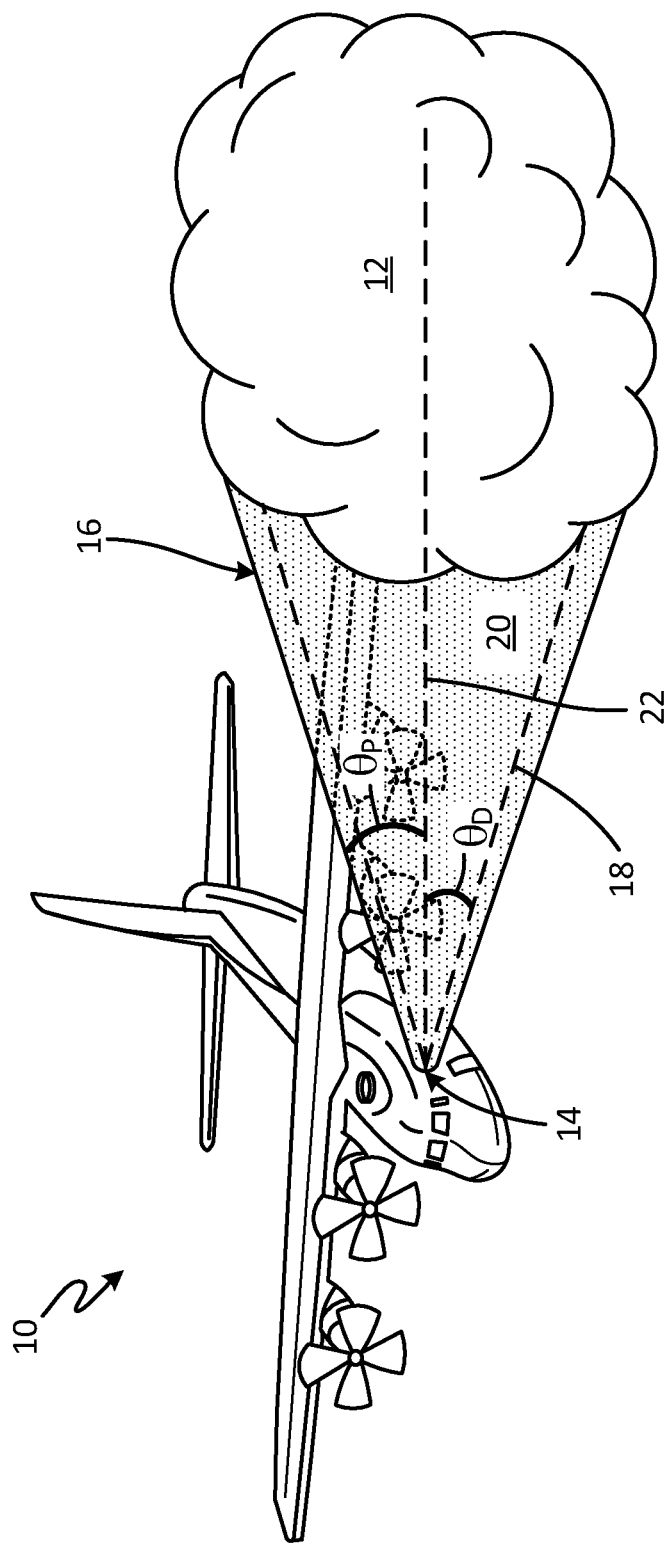
FIG. 1 is a schematic view of an aircraft using an exemplary cloud conditions measurement system to measure various metrics of a cloud in the path of the aircraft.

Apparatus and associated methods relate to probing, using quasi-optical radar, water particles within a large volume of a cloud atmosphere so as to obtain a large signal response from even a sparse distribution of water droplets in the cloud atmosphere. Such a large volume can be probed by projecting an uncollimated quasi-optical beam into the cloud atmosphere and sampling the signal backscattered from the water droplets located within the probed volume. The uncollimated quasi-optical beam can be generated by projecting a pulse of quasi-optical energy from an aperture end of a quasi-optical resonator, for example, without having a lens between the aperture end of the quasi-optical resonator and the cloud atmosphere.

The uncollimated beam diverges as it projects from the aperture end of the quasi-optical resonator. The divergent beam can be characterized by an axis of projection and an angle of projection about the axis of projection, for example. The angle of projection ($\theta_P$) can be determined by a ratio of a transverse dimension of a horn aperture, for example, to a wavelength of the quasi-optical energy. Various other metrics can be used to characterize the divergence of the projected optical beam. For example, numerical aperture (NA), focal ratio (F/#), and solid angle ($\Omega$) can all be used as metrics characterizing the divergence of the projected optical beam.

Either the aperture end of the quasi-optical resonator or an aperture for a distinct quasi-optical detector can be used to receive the quasi-optical signal backscattered from the cloud atmosphere. If a distinct quasi-optical detector is used for such purposes, the quasi-optical detector can be aligned parallel to the quasi-optical resonator so as to be sensitive to optical signals backscattered from the probed volume. The quasi-optical detector can have substantially the same field of view as the quasi-optical resonator, so as to receive signals from a volume of the cloud atmosphere that is substantially commensurate with the probed volume. By sampling the large volume of the cloud atmosphere, a continuous range-resolved backscatter signal can be detected, even for clouds having sparse distributions of water droplets.

The fields of view of both the quasi-optical resonator and the quasi-optical detector are substantially equal or substantially the same so that the volume of the cloud atmosphere probed by a signal projecting from the aperture end of the quasi-optical resonator is substantially the same volume from which a backscattered signal is received by the aperture of the quasi-optical detector. Two fields of view, and any of the measures of divergence that characterize such fields of view, are substantially equal to one another if they differ by less than ten percent. For example if $2(\theta_P-\theta_D)/(\theta_P+\theta_D)<0.1$ then the two angles (of projection $\theta P$ and of detection $\theta_D$) are substantially equal to each other.

To accommodate detection of supercooled large droplets (SLDs) that may otherwise go undetected by optical ice detection (OID) systems, millimeter and submillimeter radar may be utilized. For example, a radar transmitter may be configured to emit radiation in the IEEE G-Band (1 mm to 2.7 mm wavelength). Other wavelengths that lie close to the G-Band (e.g. 0.1 mm to 3 mm) may also be utilized such as, for example, sub-millimeter wavelengths. These wavelengths are often referred to as "quasi-optical" because while these wavelengths lie just outside the "optical" spectrum, beams of this wavelength may still be reflected and focused using the same optics as are used for radiation in the optical spectrum. Because of this, receivers and transmitters may utilize impedance-matching horns, respectively, to couple into free space rather than using bulky antennae.

FIG. 1 is a schematic view of an aircraft using an exemplary cloud conditions measurement system that is capable of measuring various metrics of a cloud in the path of the aircraft. In FIG. 1, aircraft 10 is traveling through cloud atmosphere 12. Aircraft 10 is equipped with cloud conditions measurement system 14 that is probing cloud atmosphere 12 with uncollimated quasi-optical beam 16, and backscattered beam 18. Uncollimated optical beam 16 has a relatively large divergence and probes divergent projection volume 20. Divergent projection volume 20 can be defined by axis of projection 22 and angles of projection $\theta P$ and detection $\theta_D$ about axis of projection 22. Divergent projection volume 20 may be limited by an effective distance at which uncollimated quasi-optical beam 16 has been substantially attenuated by absorption or reflection by cloud atmosphere 12. The effective distance can be calculated as the distance where at least 90% of the uncollimated quasi-optical beam 16 has been either absorbed or reflected by cloud atmosphere 12, for example. Such an effective distance can vary in response to variations of cloud atmosphere 12. For example, effective distance may be no greater than 10 meters if cloud atmosphere 12 has a high concentration of water particles.

Figure 2:
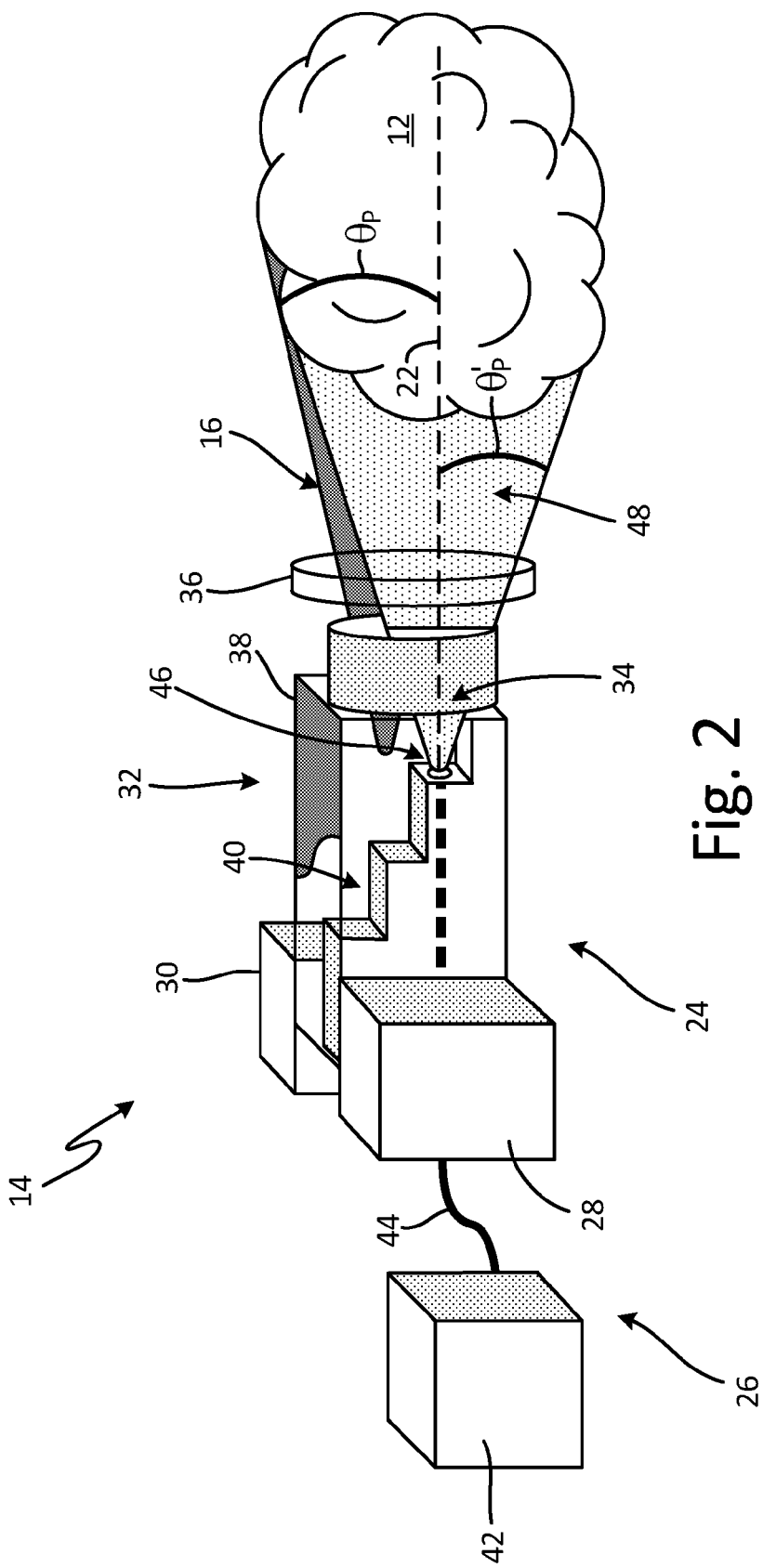
FIG. 2 is a schematic diagram of an embodiment of a cloud conditions measurement system having a divergent quasi-optical radar system.

FIG. 2 is a schematic diagram of an embodiment of a cloud conditions measurement system having a divergent quasi-optical radar system. In FIG. 2 cloud conditions measurement system 14 includes quasi-optical radar system 24 and multi-fiber optical LIDAR system 26. Quasi-optical radar system 24 includes G-band transmitter 28, G-band receiver 30, orthomode septum transducer 32, aperture 34 and window 36. Orthomode septum transducer 32 includes longitudinal resonant cavity 38 and longitudinal septum 40.

G-band transmitter generates pulses of quasi-optical energy which longitudinally propagate within longitudinal resonant cavity 38. Longitudinal septum 40 has a geometry which is configured to polarize the propagating quasi-optical signal such that the beam 16 projected from aperture 34 is circularly polarized in a first orientation (e.g., Right-hand Circularly Polarized RCP).

Projected quasi-optical beam 16 then projects from aperture 34 in a divergent fashion. The angle of propagation $\theta_P$ about the projection axis 22 is determined by a ratio of a transverse dimension (e.g., a dimension perpendicular to the longitudinal direction or to the propagation axis 22) of aperture 34 to a wavelength of the generated quasi-optical beam. In some embodiments, the angle of projection is at least 15, 20, 27.5, or at least 35 degrees, for example. Projected quasi-optical beam 16 transmits through window 36 and encounters cloud atmosphere 12 and experiences three different phenomena. First, a portion of projected quasi-optical beam 16 transmits through cloud atmosphere 12, albeit in many cases such a portion can be small or even infinitesimal. Second, a portion of projected quasi-optical beam 16 is absorbed by cloud atmosphere 12. Third, a portion of projected quasi-optical beam 16 is backscattered by cloud atmosphere 12.

The portion of quasi-optical beam 16 that is backscattered by cloud atmosphere 12 can be detected by G-band receiver 30 to the extent that such portions are received by aperture 34 of orthomode septum transducer 32. The received portion of quasi-optical beam 16 backscattered by cloud atmosphere 12 then propagates longitudinally within resonant cavity 38. Such propagation of the received backscattered beam is in a direction anti-parallel to the direction of propagation of the quasi-optical beam generated by G-band transmitter 28. Septum 40 of orthomode septum transducer 32 is configured to act as a polarization filter. Thus, orthomode septum transducer 32 is configured to permit only circularly-polarized quasi-optical signals that are of the opposite orientation (e.g., Left-hand Circularly Polarized LCP) to that of the projected beam to be received by G-band receiver 30.

Because orthomode septum transducer 32 uses aperture 34 for both transmission and reception of quasi-optical signals, the field of view for both transmission and reception of quasi-optical beams is substantially equal (e.g., $\theta_P = \theta_D$). And because septum 40 both polarizes the generated beam in a first orientation and filters the received beam in a second orientation opposite the first orientation, such orthomode septum transducers are configured to detect the portion of projected beam 16 backscattered primarily by liquid droplets of cloud atmosphere 12. Such detection of liquid droplets is due to the phenomenon that liquid droplets generally backscatter electromagnetic signals in a polarity-reversing fashion. Conversely, ice crystals tend to backscatter electromagnetic signal with both polarization states.

Multi-fiber optical LIDAR system 26 includes generator detector system 42 and fiber bundle 44. Multi-fiber optical LIDAR system 26 generates optical pulses that are carried by one or more fibers of optical fiber bundle 44. Optical fiber bundle 44 travels within a longitudinally oriented lumen within septum 40 of orthomode septum transducer 32. The optical beam is then projected from transmission end 46 of the fiber that carries the generated optical beam.

Projected optical beam 48 then projects from transmission end 46 of fiber bundle 44 in a divergent fashion. The angle of propagation $\theta'_P$ about the projection axis 22 is determined by the numerical aperture of the fiber, which is affected by the indices of refraction of the core and the cladding of the fiber. Projected optical beam 48 transmits through window 36 and encounters cloud atmosphere 12 and experiences three different phenomena. First, a portion of projected optical beam 48 transmits through cloud atmosphere 12, albeit in many cases such a portion can be small or even infinitesimal. Second, a portion of projected optical beam 48 is absorbed by cloud atmosphere 12. Third, a portion of projected optical beam 48 is backscattered by cloud atmosphere 12.

The portion of optical beam 48 that is backscattered by cloud atmosphere 12 can be received by a fiber of fiber bundle 44. In some embodiments, the receiving fiber can be the same fiber as was used to transmit and then project optical beam 48 or a different fiber of fiber bundle 48. If the receiving fiber is aligned substantially parallel with the transmitting fiber as well as being juxtaposed adjacent to the transmitting fiber, the field of view for both transmission and reception of optical beams is substantially equal (e.g., $\theta'_P = \theta'_D$). Note, the prime designators are used to differentiate parameters associated with optical LIDAR system 26 from those parameters associated with quasi-optical radar system 24.

Various embodiments of cloud conditions measurement systems may be configure in various manners. For example, FIG. 2 depicts a cloud conditions measurement system that employs both G-band quasi-optical radar probing of a cloud atmosphere as well as optical probing of the cloud atmosphere. In some embodiments, only G-band quasi-optical radar probing may be used for measuring parameters of a cloud atmosphere.

Figure 3:
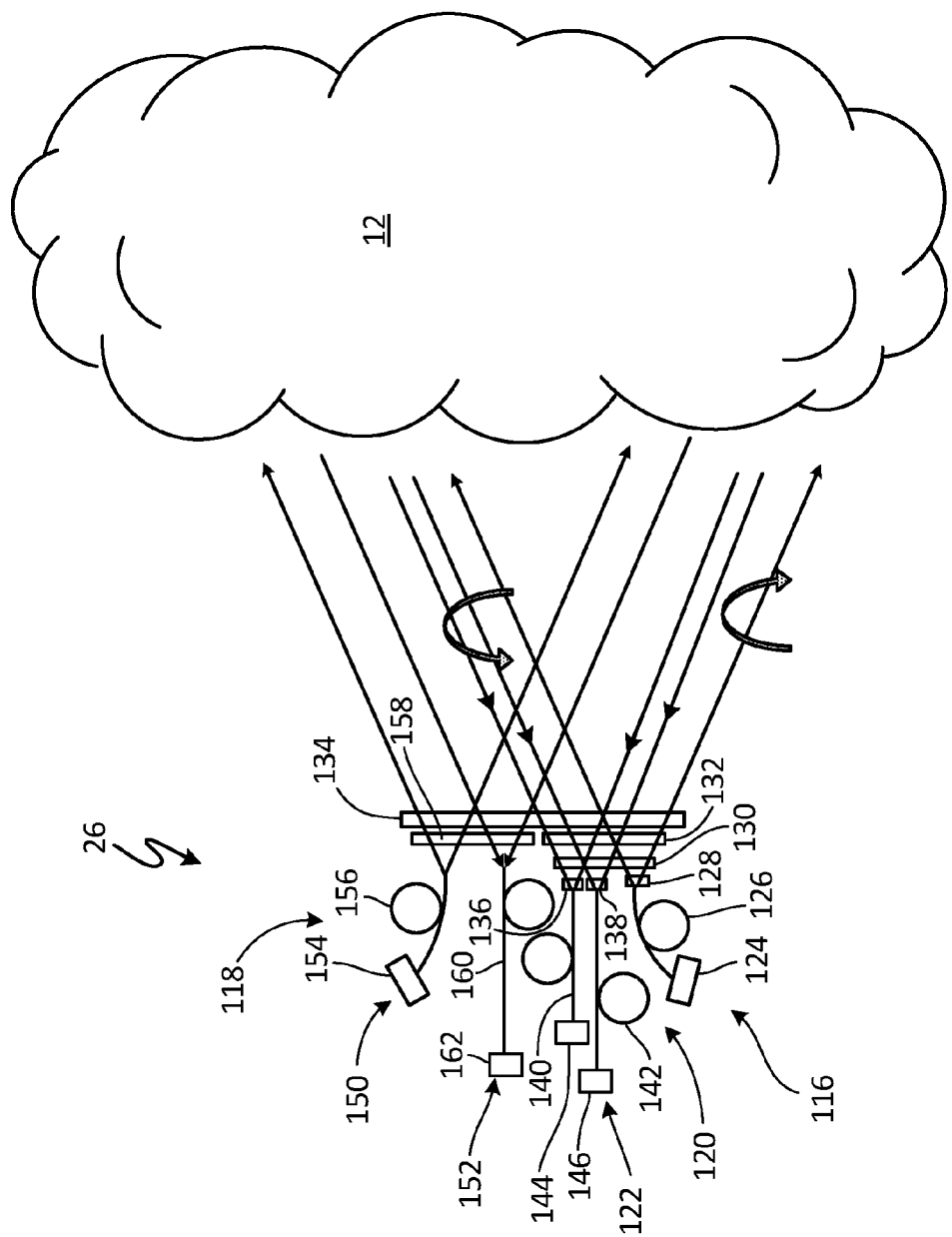
FIG. 3 is a schematic diagram of an exemplary optical LIDAR system.

FIG. 3 is a schematic diagram of an exemplary multi-fiber optical LIDAR system. In FIG. 3, multi-fiber optical LIDAR system 26 is shown probing cloud atmosphere 12. Multi-fiber optical LIDAR system 26 is an uncollimated system so as to probe substantially the same volume of cloud atmosphere 12 as is probed by quasi-optical radar system 24 (depicted in FIG. 2) to which it can provide complementary probing data. Multi-fiber optical LIDAR system 26 includes first optical transmitter 120 and first optical receiver 122. First optical transmitter 120 includes fiber-coupled laser 124, transmitter fiber 126, linear polarizer 128, quarter-wave plate 130, bandpass filter 132, and window 134.

Fiber-coupled laser 124 generates pulses of optical energy having first wavelength. Transmitter fiber 126 transmits these pulses of optical energy to a projecting end of transmitter fiber 126. These pulses of optical energy diverge from the projecting end of the transmitter fiber so as to become an uncollimated beam. The uncollimated beam then projects from transmitter fiber 126 to probe cloud atmosphere 12 via transmission through linear polarizer 128, quarter-wave plate 130, bandpass filter 132, and window 134. These elements 128, 130, 132, 134, through which the uncollimated beam transmits, cause the uncollimated beam to be circularly polarized.

Cloud atmosphere 12 then backscatters the uncollimated beam that probes the cloud atmosphere. The backscattered signal then is transmitted back through window 134, bandpass filter 132 and quarter-wave plate 130 in reverse order that the probing beam transmitted therethrough. These elements 134, 132, 130, through which the backscattered signal transmits, cause the backscattered signal to have orthogonal planar polarized components.

First optical receiver 122 includes linear polarizers 136, 138 receiver fibers 140, 142, and optical detectors 144, 146. Linear polarizers 136, 138, are configured in orthogonal directions, one to another, so as to each permit transmission of components corresponding to backscattered signals that are circularly polarized in opposite directions (e.g., left-hand circularly polarized and right-hand circularly polarized). Receiver fibers 140, 142 are oriented substantially parallel to and transmitter fiber 126, and receiver fibers 140, 142 have a field of view commensurate with (e.g., substantially equal to) the field of view corresponding to transmitter fiber 126, so as to receive backscattered signals from the volume of cloud atmosphere 12 that is probed by the uncollimated beam projected from transmitter fiber 126.

Second uncollimated system 148 includes second optical transmitter 150 and second optical receiver 152. Second uncollimated system 148 is similar to first uncollimated system 116, except that polarization filters are not used. Another difference is that second uncollimated system 148 generates and detects signals of a second wavelength, different from the first wavelength used in first uncollimated system 116.

Second optical transmitter 150 includes fiber-coupled laser 154, transmitter fiber 156 and window 134. Fiber-coupled laser 154 generates pulses of optical energy having the second wavelength. Transmitter fiber 156 transmits these pulses of optical energy to a projecting end of transmitter fiber 156. These pulses of optical energy diverge from the projecting end of the transmitter fiber so as to become an uncollimated beam. The uncollimated beam then projects from transmitter fiber 156 to probe cloud atmosphere 12 via transmission through window 134.

Cloud atmosphere 12 then backscatters the uncollimated beam that probes cloud atmosphere 12. The backscattered signal then transmits through window 134 and bandpass filter 158. Second optical receiver 152 includes receiver fiber 160, and optical detector 162. Receiver fiber 160 has a field of view commensurate with the field of view corresponding to transmitter fiber 156, so as to receive backscattered signals from the volume of cloud atmosphere 12 that is probed by the uncollimated beam projected from transmitter fiber 156.

Figure 4:
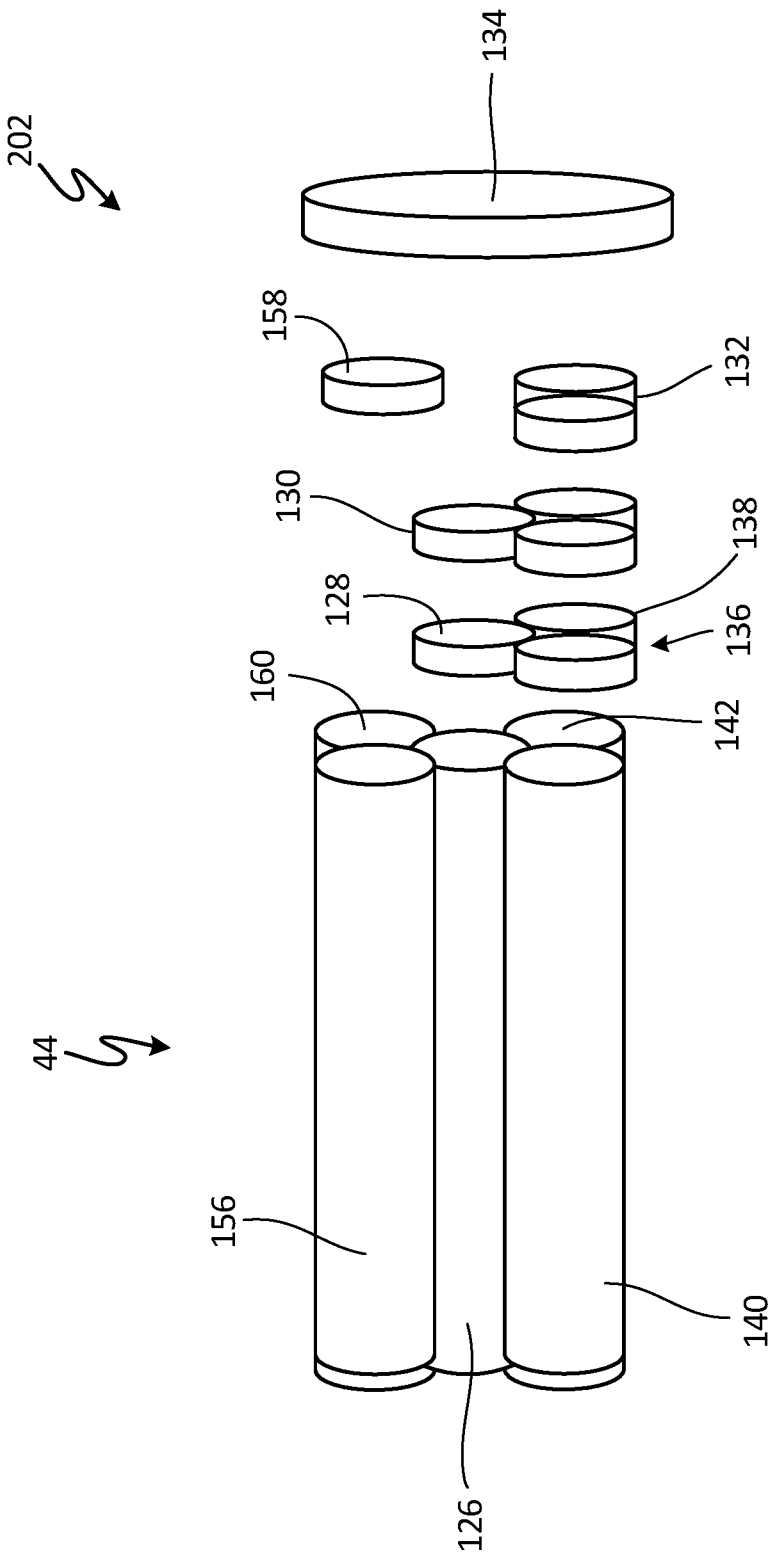
FIG. 4 is a schematic diagram of an exemplary fiber bundle for use in a cloud conditions measurement system, such as that depicted in FIG. 3.

FIG. 4 is a schematic diagram of an exemplary fiber bundle for use in multi-fiber optical LIDAR system 26, such as that depicted in FIG. 3. In FIG. 4, fiber bundle 44 includes: optical fibers 126, 140, 142, 156, 160; linear polarizers 128, 136, 138; quarter wave plates 130; bandpass filters 132, 158; and window 134. Fiber bundle 44 depicts an exemplary embodiment of a portion of Multi-fiber optical LIDAR system 26 depicted in FIG. 3. The depicted configuration of optical elements shows transmitter fibers 126, 156 bundled with receiver fibers 140, 142, 160. Transmitter fibers 126, 156 are adjacent to and aligned parallel to receiver fibers 140, 142, 160. Such a configuration facilitates the alignment of receiver fibers 140, 142 to corresponding transmitter fiber 126 and facilitates alignment of receiver fiber 160 to corresponding transmitter fiber 156.

The depicted arrangement of optical elements in FIG. 4 also depicts transmitter fibers 126, 156 that have substantially the same diameter as receiver fibers 140, 142, 160. Such similarly sized fibers can provide similar fields of view for transmitter fibers 126, 156 and receiver fibers 140, 142, 160. Another advantage of the depicted configuration is that the resulting size of fiber bundle 200 is small, because of the compact arrangement of elements. Transmitter fibers 126, 156 and the receiver fibers 140, 142, 160 can be oriented in a desired direction. In some embodiments the bundle of fibers 126, 140, 142, 156, 160 may be oriented as a group in a given direction. Projecting/receiving end 202 of fiber bundle 44 can be oriented for probing cloud atmosphere 12 in a desired direction relative to an aircraft to which multi-fiber optical LIDAR system 26 is coupled.

Figure 5:
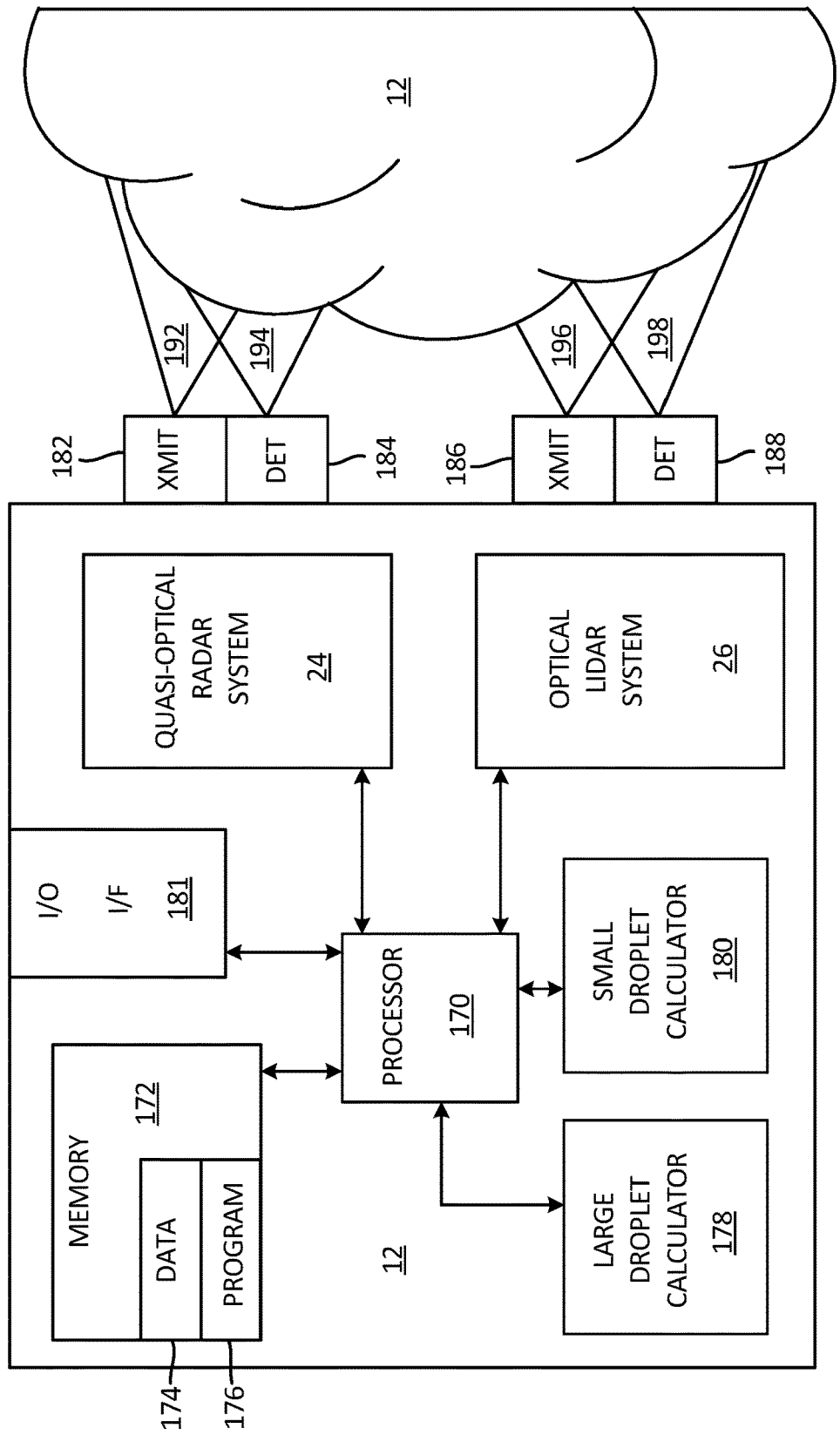
FIG. 5 is a block diagram of an exemplary cloud conditions metric calculator.

FIG. 5 is a block diagram of an exemplary cloud conditions metric calculator. In FIG. 5, optical cloud conditions metric calculator 114 includes: measurement system 14 includes quasi-optical radar system 24; multi-fiber optical LIDAR system 26; processor 170; memory 172 having data memory locations 174 and program memory locations 176; large droplet size calculator 178; small droplet size calculator 180; and input/output interface 181. Quasi-optical radar system 24 includes quasi-optical transmitter 182 shown projecting uncollimated quasi-optical beam 192 into cloud atmosphere 12, and quasi-optical receiver 184 shown receiving backscattered quasi-optical beam 194. Backscattered quasi-optical beam 194 is a portion of projected quasi-optical beam 192 backscattered by water particles in cloud atmosphere 12.

Multi-fiber optical LIDAR system 26 includes optical transmitter 186 shown projecting uncollimated optical beam 196 into cloud atmosphere 12, and optical receiver 188 shown receiving backscattered quasi-optical beam 198. Backscattered quasi-optical beam 198 is a portion of projected quasi-optical beam 196 backscattered by water particles in cloud atmosphere 12. Processor 170 can receive program instructions from program memory 176. Processor 170 can then execute program instructions to control quasi-optical radar system 24 and optical LIDAR system 26. Processor 170, for example, might send commands requesting both quasi-optical radar system 24 and optical LIDAR system 26 to generate and project pulses of energy (e.g., a quasi-optical pulse and an optical pulse, respectively) into cloud atmosphere 12.

Processor 170 then receives backscattered signals from the quasi-optical detector 184 and optical detector 188. Processor 170 can then send the received quasi-optical and optical backscatter signals to large droplet calculator 178 and small droplet calculator 180, respectively. Large and small droplet calculators 178, 180 might fit the received backscatter signals to LIDAR signal models. Processor 170 can receive the coefficients and/or parameters that large and small droplet calculators 178, 180. Processor 170 can store the received parameters in data memory locations 174 of memory 172. Processor 170 can then calculate, based on the fit model parameters, a size distribution of both large and small water particles in cloud atmosphere 12. Processor 170 can then communicate the calculated large and small droplet size distribution to systems external to cloud conditions metric calculator 114 via Input/Output Interface 181. In some embodiments, droplet size distribution calculation is performed by processor 170.

Processor 170, in one example, is configured to implement functionality and/or process instructions for execution within cloud conditions metric calculator 114. For instance, processor 170 can be capable of processing instructions stored in program memory 176. Examples of processor 170 can include any one or more of a microprocessor, a controller, a digital signal processor (DSP), an application specific integrated circuit (ASIC), a field-programmable gate array (FPGA), or other equivalent discrete or integrated logic circuitry.

Memory 172 can be configured to store information within cloud conditions metric calculator 114 during operation. Memory 172, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 172 is a temporary memory, meaning that a primary purpose of memory 172 is not long-term storage. Memory 172, in some examples, is described as volatile memory, meaning that memory 172 do not maintain stored contents when power to cloud conditions metric calculator 114 is turned off. Examples of volatile memories can include random access memories (RAM), dynamic random access memories (DRAM), static random access memories (SRAM), and other forms of volatile memories. In some examples, memory 172 is used to store program instructions for execution by processor 170. Memory 172, in one example, is used by software or applications running on cloud conditions metric calculator 114 (e.g., a software program implementing calculations of cloud conditions metrics) to temporarily store information during program execution.

In some examples, memory 172 can also include one or more computer-readable storage media. Memory 172 can be configured to store larger amounts of information than volatile memory. Memory 172 can further be configured for long-term storage of information. In some examples, memory 172 includes non-volatile storage elements. Examples of such non-volatile storage elements can include magnetic hard discs, optical discs, flash memories, or forms of electrically programmable memories (EPROM) or electrically erasable and programmable (EEPROM) memories.

Input/output interface 181 can be used to communicate information between cloud conditions metric calculator 114 and an aircraft. In some embodiments, such information can include aircraft conditions, flying conditions, and/or atmospheric conditions. In some embodiments, such information can include data processed by cloud conditions metric calculator 114, such as, for example, alert signals. Input/output interface 181 can also include a communications module. Input/output interface 181, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Figure 6:
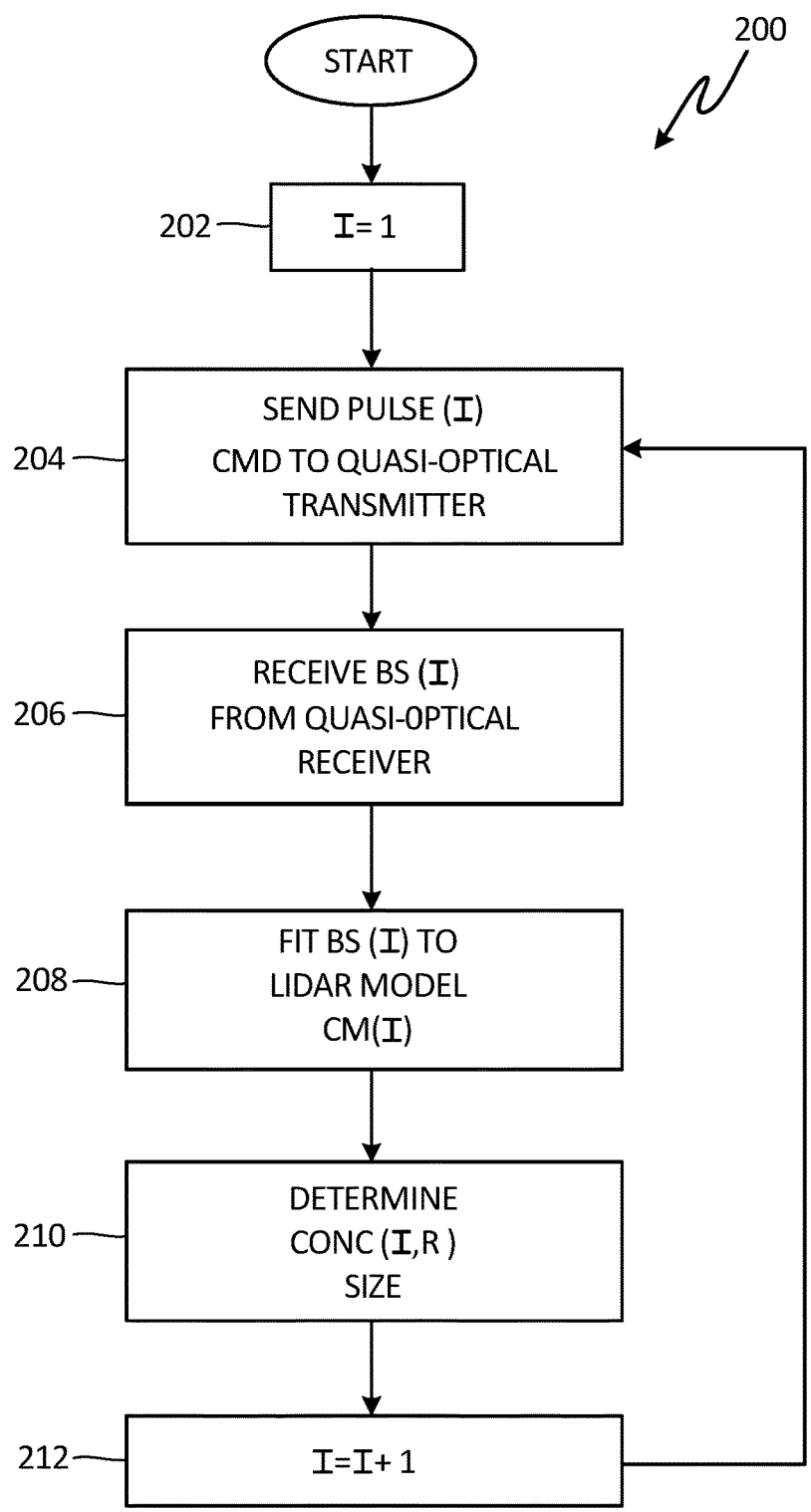
FIG. 6 is a flow chart of an exemplary method for measuring cloud conditions.

FIG. 6 is a flow chart of an exemplary method for measuring cloud conditions. In FIG. 6, method 200 is depicted from the perspective of processor 170 (shown in FIG. 5). Method 200 begins at step 202 where processor 170 initializes index I. Then, at step 204, processor 170 sends a command signal PULSE(I) to quasi-optical transmitters 182 (depicted in FIG. 5) to generate a pulse of quasi-optical energy. In response to the command signal PULSE(I), quasi-optical transmitter 182 generates a pulse of optical energy having a wavelength. In various embodiments, various wavelengths of quasi-optical energy may be generated. In some embodiments the wavelength may be between 100 microns and 10 millimeters, for example. In response to receiving the command signal, the quasi-optical transmitter generates and projects a pulse of the quasi-optical energy into a divergent projection volume of the cloud atmosphere.

Quasi-optical receiver 184 receives a portion of the projected pulse of quasi-optical energy backscattered by a backscattering population of water particles within the divergent projection volume of the cloud atmosphere 12. At step 206, processor 170 receives a backscatter signal BS(I) from quasi-optical receiver 184, the backscatter signal BS(I) corresponding to the received portion of the projected pulse of quasi-optical energy backscattered by a backscattering population of water particles within the divergent projection volume of the cloud atmosphere.

Then, at step 208, processor 170 sends the backscatter signal BS(I) to large droplet calculator 178, where backscatter signal BS(I) will be fit to a LIDAR signal model. Processor 170 will then receive, from large droplet calculator 178, the LIDAR signal model parameters that large droplet calculator 178 fit to backscatter signal BS(I). At step 210, processor 170 will determine cloud metrics, based on the received LIDAR signal model parameters. Processor 170 may then output these determined cloud metrics via Input/Output Interface 181. At step 212, processor 170 increments index I, and the method returns to step 204, where processor sends another command PULSE(I) to quasi-optical transmitter 182.

In some embodiments, processor 170 could also control optical LIDAR system 26. In such embodiments, processor 170 could send a command signal PULSE'(I) to optical transmitters 186 (depicted in FIG. 5) to generate a pulse of optical energy. In response to the command signal PULSE' (I), optical transmitter 186 generates a first pulse of optical energy having a wavelength. In various embodiments, various wavelengths of optical energy may be generated. In some embodiments the wavelength may be between 0.7 microns and 2.0 microns, for example. In response to receiving the command signal, the optical transmitter generates and projects a pulse of optical energy into a divergent projection volume of the cloud atmosphere. In some embodiments, the divergent projection volume of optical LIDAR system 26 intersects the divergent projection volume of quasi-optical radar system 24.

Optical receiver 188 receives a portion of the projected pulse of optical energy backscattered by a backscattering population of water particles within the divergent projection volume of the cloud atmosphere 12. Processor 170 may then receive a backscatter signal BS '(I) from optical receiver 188, the backscatter signal BS'(I) corresponding to the received portion of the projected pulse of optical energy backscattered by a backscattering population of water particles within the divergent projection volume of cloud atmosphere 12.

Processor can send the backscatter signal BS'(I) to small droplet calculator 180, where backscatter signal BS'(I) will be fit to a LIDAR signal model. Processor 170 will then receive, from small droplet calculator 180, the LIDAR signal model parameters that small droplet calculator 180 fit to backscatter signal BS'(I). Processor 170 can then determine cloud metrics, based on the received LIDAR signal model parameters. Processor 170 may then output these determined cloud metrics via Input/Output Interface 181.

In some embodiments, processor 170 may use both cloud metrics corresponding to large droplet calculator 178 and cloud metrics corresponding to small droplet calculator 180. In some embodiments, the large droplet data may be used to improve the small droplet data. For example, the quasi-optical pulses of energy may be backscattered by large water droplets, but may be relatively insensitive to small water droplets. Thus, a resulting backscatter signal may be indicative of large water droplet backscattering. Optical pulses of energy may be backscattered by both large and small water droplets. Therefore, a resulting backscatter signal may be indicative of both large and small water droplet backscattering. Processor 170 may subtract a large water droplet backscattering signal, obtained using quasi-optical radar system 24, from a backscattering signal based on optical LIDAR system 26. The resulting difference signal may be indicative of only small water droplet backscattering. An improved calculation of small water droplet size may be obtained using such a method, for example.

The following are non-exclusive descriptions of possible embodiments of the present invention.

A system for measuring metrics of a backscattering population of water particles of a cloud atmosphere. The system includes a quasi-optical transmitter configured to project a pulse of quasi-optical energy from a horn aperture into a divergent projection volume of the cloud atmosphere. The divergent projection volume is defined by an axis of projection and an angle of projection about the axis of projection. The angle of projection is based on a ratio of a transverse dimension of the horn aperture to a wavelength of the quasi-optical energy. The system includes a quasi-optical receiver configured to detect a portion of the projected pulse of quasi-optical energy backscattered by the backscattering population of water particles within the divergent projection volume of the cloud atmosphere. The system also includes a cloud metric calculator configured to determine, based on a detected portion of the projected pulse of quasi-optical energy backscattered by the backscattering population of water particles within the divergent projection volume of the cloud atmosphere, a density of the backscattering population of water particles within the divergent projection volume of the cloud atmosphere.

A further embodiment of the foregoing system, wherein the quasi-optical transmitter can be further configured to polarize the pulse of quasi-optical energy in a first polarization state. A further embodiment of any of the foregoing systems, wherein the quasi-optical receiver can be further configured to filter the portion of the projected pulse of quasi-optical energy backscattered by the backscattering population of water particles of the cloud atmosphere, the filtered portion having a second polarization state. A further embodiment of any of the foregoing systems, wherein the quasi-optical transmitter and the quasi-optical receiver are components of an orthomode transducer. A further embodiment of any of the foregoing systems, wherein the orthomode transducer can be a septum orthomode transducer. A further embodiment of any of the foregoing systems, wherein the ratio of the transverse dimension of the horn aperture to the wavelength of the projected quasi-optical energy can be between 3.0 and 4.0.

A further embodiment of any of the foregoing systems, wherein the angle of projection is greater than 15 degrees about the axis of projection. A further embodiment of any of the foregoing systems, wherein the wavelength of the projected quasi-optical energy can be between 100 micrometers and 10 millimeters. A further embodiment of any of the foregoing systems, wherein the cloud metric calculator can be further configured to estimate, based on the detected portion of the projected pulse of quasi-optical energy backscattered by the backscattering population of water particles within the divergent projection volume of the cloud atmosphere, an effective size of the backscattering population of water particles within the divergent projection volume of the cloud atmosphere.

A further embodiment of any of the foregoing systems, wherein the divergent projection volume is a first divergent projection volume, the axis of projection is a first axis of projection, the angle of projection is a first angle of projection, the backscattering population is a first backscattering population, and the determined density is a first determined density. The system further includes an optical cloud metric measurement device. The optical cloud metric measurement device can include an optical transmitter configured to generate a pulse of optical energy. The optical cloud metric measurement device can include a transmitter fiber configured to receive the generated pulse of optical energy and to project the received pulse of optical energy from a transmission end of the optical fiber into a second divergent projection volume of the cloud atmosphere. The second divergent projection volume can be defined by a second axis of projection and a second angle of projection about the second axis of projection. The second angle of projection can be based on the numerical aperture of the fiber. The optical cloud metric measurement device can include a receiver fiber configured to receive a portion of the projected pulse of optical energy backscattered by a second backscattering population of water particles within the second divergent projection volume of the cloud atmosphere. The cloud metric calculator can be further configured to determine, based on a detected portion of the projected pulse of optical energy backscattered by the second backscattering population of water particles within the second divergent projection volume of the cloud atmosphere, a second density of the second backscattering population of water particles within the divergent projection volume of the cloud atmosphere.

A further embodiment of any of the foregoing systems, wherein the second axis of projection is oriented within 10 degrees of the first axis of projection. A further embodiment of any of the foregoing systems, wherein the second angle of projection is within 10 degrees of the first angle of projection. A further embodiment of any of the foregoing systems, wherein the wavelength of the generated pulse of optical energy is between 0.7 microns and 2.0 microns. A further embodiment of any of the foregoing systems, wherein the transmitter fiber runs longitudinally within a septum of an orthomode septum transducer.

Some embodiments relate to a method for measuring metrics of a backscattering population of water particles of a cloud atmosphere. The method includes projecting a pulse of quasi-optical energy into a divergent projection volume of the cloud atmosphere. The divergent projection volume is defined by an axis of projection and an angle of projection about the axis of projection. The angle of projection based on a ratio of a transverse dimension of a transmitting aperture to a wavelength of the quasi-optical energy. The method includes receiving a portion of the projected pulse of quasi-optical energy backscattered by the backscattering population of water particles within the divergent projection volume of the cloud atmosphere. The method also includes determining, based on a detected portion of the projected pulse of quasi-optical energy backscattered by the backscattering population of water particles within the divergent projection volume of the cloud atmosphere, a density of the backscattering population of water particles within the divergent projection volume of the cloud atmosphere.

The method of the preceding paragraph can optionally include, additionally and/or alternatively, any one or more of the following features, configurations and/or additional steps: estimating, based on a detected portion of the projected pulse of optical energy backscattered by the backscattering population of water particles within the divergent projection volume of the cloud atmosphere, an effective size of the backscattering population of water particles within the divergent projection volume of the cloud atmosphere. A further embodiment of any of the foregoing methods, wherein the angle of projection can be greater than 15 degrees. A further embodiment of any of the foregoing methods, wherein the wavelength of the projected quasi-optical energy can be between 100 micrometers and 10 millimeters.

A further embodiment of any of the foregoing methods, wherein the divergent projection volume is a first divergent projection volume, the backscattering population is a first backscattering population, and the determined density is a first determined density. Any of the foregoing methods can optionally include, additionally and/or alternatively, any one or more of the following features, configurations and/or additional steps: projecting a pulse of optical energy into a second divergent projection volume of the cloud atmosphere, the second divergent projection volume defined by a second axis of projection and a second angle of projection about the second axis of projection; receiving a portion of the projected pulse of optical energy backscattered by a second backscattering population of water particles within the second divergent projection volume of the cloud atmosphere; and determining, based on a detected portion of the projected pulse of optical energy backscattered by the second backscattering population of water particles within the second divergent projection volume of the cloud atmosphere, a second density of the second backscattering population of water particles within the second divergent projection volume of the cloud atmosphere.

A further embodiment of any of the foregoing methods, wherein an intersection of the first and the second divergent projection volumes can be at least 90% of each of the first and the second divergent projection volumes. A further embodiment of any of the foregoing methods, wherein the wavelength of the generated pulse of optical energy can be between 0.7 microns and 2.0 microns.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for measuring metrics of backscattering populations of water particles of a cloud atmosphere, the system comprising:
   a quasi-optical transmitter configured to project a pulse of quasi-optical energy from a horn aperture into a first divergent projection volume of the cloud atmosphere, the first divergent projection volume defined by a first axis of projection and a first angle of projection about the first axis of projection, the first angle of projection based on a ratio of a transverse dimension of the horn aperture to a wavelength of the quasi-optical energy;
   a quasi-optical receiver configured to detect a portion of the projected pulse of quasi-optical energy backscattered by a first backscattering population of water particles within the first divergent projection volume of the cloud atmosphere;
   a cloud metric calculator configured to determine, based on a first detected portion of the projected pulse of quasi-optical energy backscattered by the first backscattering population of water particles within the first divergent projection volume of the cloud atmosphere, a first density of the first backscattering population of water particles within the first divergent projection volume of the cloud atmosphere;
   an optical transmitter configured to generate a pulse of optical energy;
   a transmitter fiber configured to receive the generated pulse of optical energy and to project the received pulse of optical energy from a transmission end of the optical fiber into a second divergent projection volume of the cloud atmosphere, the second divergent projection volume defined by a second axis of projection and a second angle of projection about the second axis of projection, the second angle of projection based on the numerical aperture of the fiber; and
   a receiver fiber configured to receive a portion of the projected pulse of optical energy backscattered by a second backscattering population of water particles within the second divergent projection volume of the cloud atmosphere,
   wherein the cloud metric calculator is further configured to determine, based on a detected portion of the projected pulse of optical energy backscattered by the second backscattering population of water particles within the second divergent projection volume of the cloud atmosphere, a second density of the second backscattering population of water particles within the divergent projection volume of the cloud atmosphere.

2. The system of claim 1, wherein the quasi-optical transmitter is further configured to polarize the pulse of quasi-optical energy in a first polarization state.

3. The system of claim 1, wherein the quasi-optical receiver is further configured to filter the portion of the projected pulse of quasi-optical energy backscattered by the backscattering population of water particles of the cloud atmosphere, the filtered portion having a second polarization state.

4. The system of claim 1, wherein the quasi-optical transmitter and the quasi-optical receiver are components of an orthomode transducer.

5. The system of claim 4, wherein the orthomode transducer is a septum orthomode transducer.

6. The system of claim 1, wherein the ratio of the transverse dimension of the horn aperture to the wavelength of the projected quasi-optical energy is between 3.0 and 4.0.

7. The system of claim 1, wherein the angle of projection is greater than 15 degrees about the axis of projection.

8. The system of claim 1, wherein the wavelength of the projected pulse of quasi-optical energy is between 100 micrometers and 10 millimeters.

9. The system of claim 1, wherein the cloud metric calculator is further configured to estimate, based on the detected portion of the projected pulse of quasi-optical energy backscattered by the backscattering population of water particles within the divergent projection volume of the cloud atmosphere, an effective size of the backscattering population of water particles within the divergent projection volume of the cloud atmosphere.

10. The system of claim 1, wherein the second axis of projection is oriented within 10 degrees of the first axis of projection.

11. The system of claim 1, wherein the second angle of projection is within 10 degrees of the first angle of projection.

12. The system of claim 1, wherein the transmitter fiber runs longitudinally within a septum of an orthomode septum transducer.

13. A method for measuring metrics of backscattering populations of water particles of a cloud atmosphere, the method comprising:
- projecting a pulse of quasi-optical energy into a first divergent projection volume of the cloud atmosphere, the first divergent projection volume defined by a first axis of projection and a first angle of projection about the first axis of projection, the first angle of projection based on a ratio of a transverse dimension of a transmitting aperture to a wavelength of the quasi-optical energy;
- receiving a portion of the projected pulse of quasi-optical energy backscattered by a first backscattering population of water particles within the first divergent projection volume of the cloud atmosphere;
- determining, based on a detected portion of the projected pulse of quasi-optical energy backscattered by the first backscattering population of water particles within the first divergent projection volume of the cloud atmosphere, a first density of the backscattering population of water particles within the first divergent projection volume of the cloud atmosphere;
- projecting a pulse of optical energy into a second divergent projection volume of the cloud atmosphere, the second divergent projection volume defined by a second axis of projection and a second angle of projection about the second axis of projection;
- receiving a portion of the projected pulse of optical energy backscattered by a second backscattering population of water particles within the second divergent projection volume of the cloud atmosphere; and
- determining, based on a detected portion of the projected pulse of optical energy backscattered by the second backscattering population of water particles within the second divergent projection volume of the cloud atmosphere, a second density of the second backscattering population of water particles within the second divergent projection volume of the cloud atmosphere.

14. The method of claim 13, wherein the angle of projection is greater than 15 degrees.

15. The method of claim 13, wherein the wavelength of the projected quasi-optical energy is between 100 micrometers and 10 millimeters.

16. The method of claim 13, further comprising:
- estimating, based on a detected portion of the projected pulse of optical energy backscattered by the backscattering population of water particles within the divergent projection volume of the cloud atmosphere, an effective size of the backscattering population of water particles within the divergent projection volume of the cloud atmosphere.

17. The method of claim 13, wherein an intersection of the first and the second divergent projection volumes is at least 90% of each of the first and the second divergent projection volumes.

18. The method of claim 13, wherein the wavelength of the generated pulse of quasi-optical energy is between 1.0 mm and 2.7 mm.

19. The system of claim 1, wherein the wavelength of the generated pulse of optical energy is between 0.7 microns and 2.0 microns.

* * * * *